Sept. 8, 1953  P. H. ALLEN ET AL  2,651,463
OPTICAL OPERATION CONTROL DEVICE
Filed Jan. 11, 1946  4 Sheets-Sheet 1

INVENTORS
Philip H. Allen
Benjamin J. Chromy

Sept. 8, 1953  P. H. ALLEN ET AL  2,651,463
OPTICAL OPERATION CONTROL DEVICE
Filed Jan. 11, 1946  4 Sheets-Sheet 2
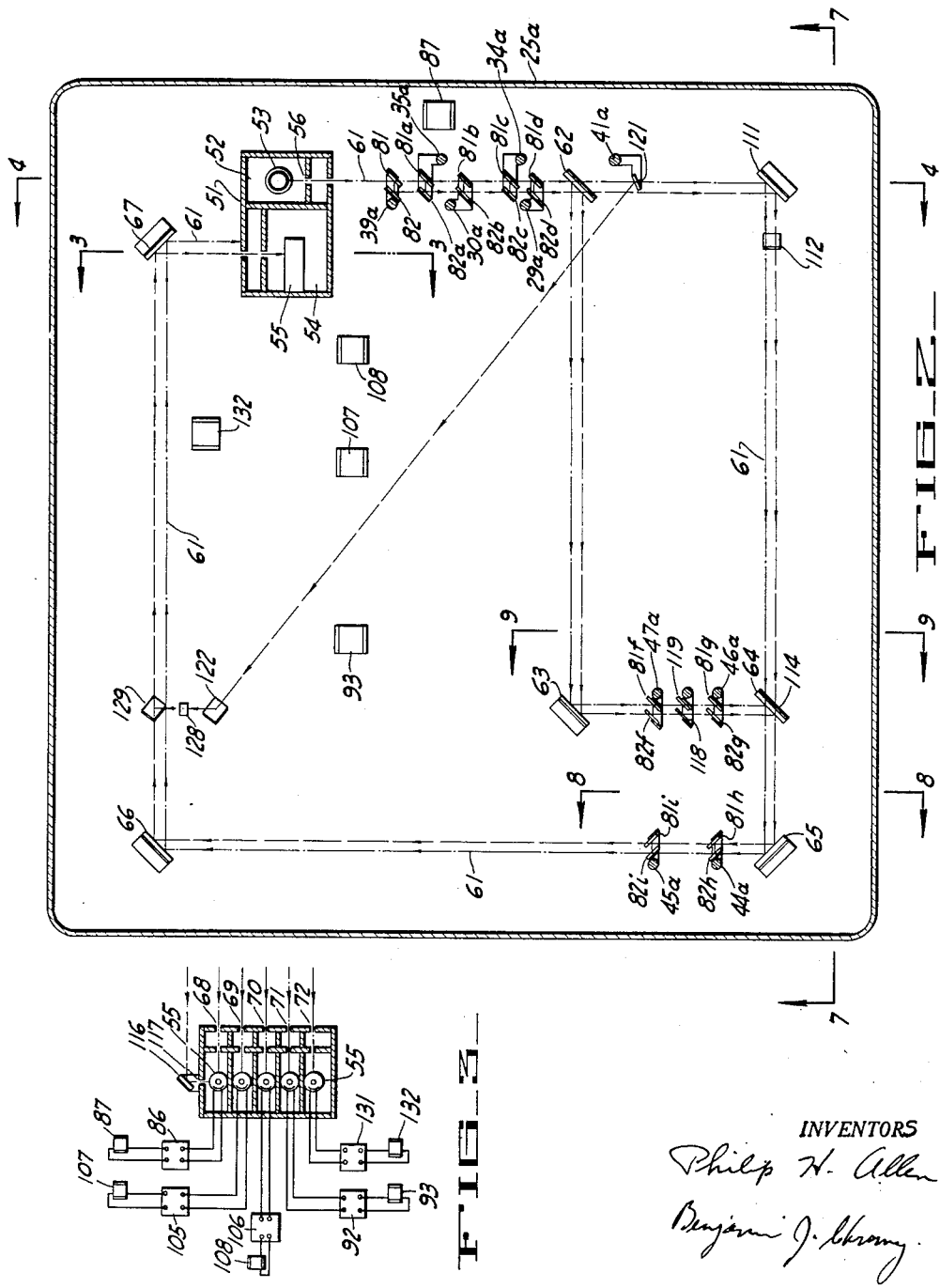
INVENTORS
Philip H. Allen
Benjamin J. Chromy

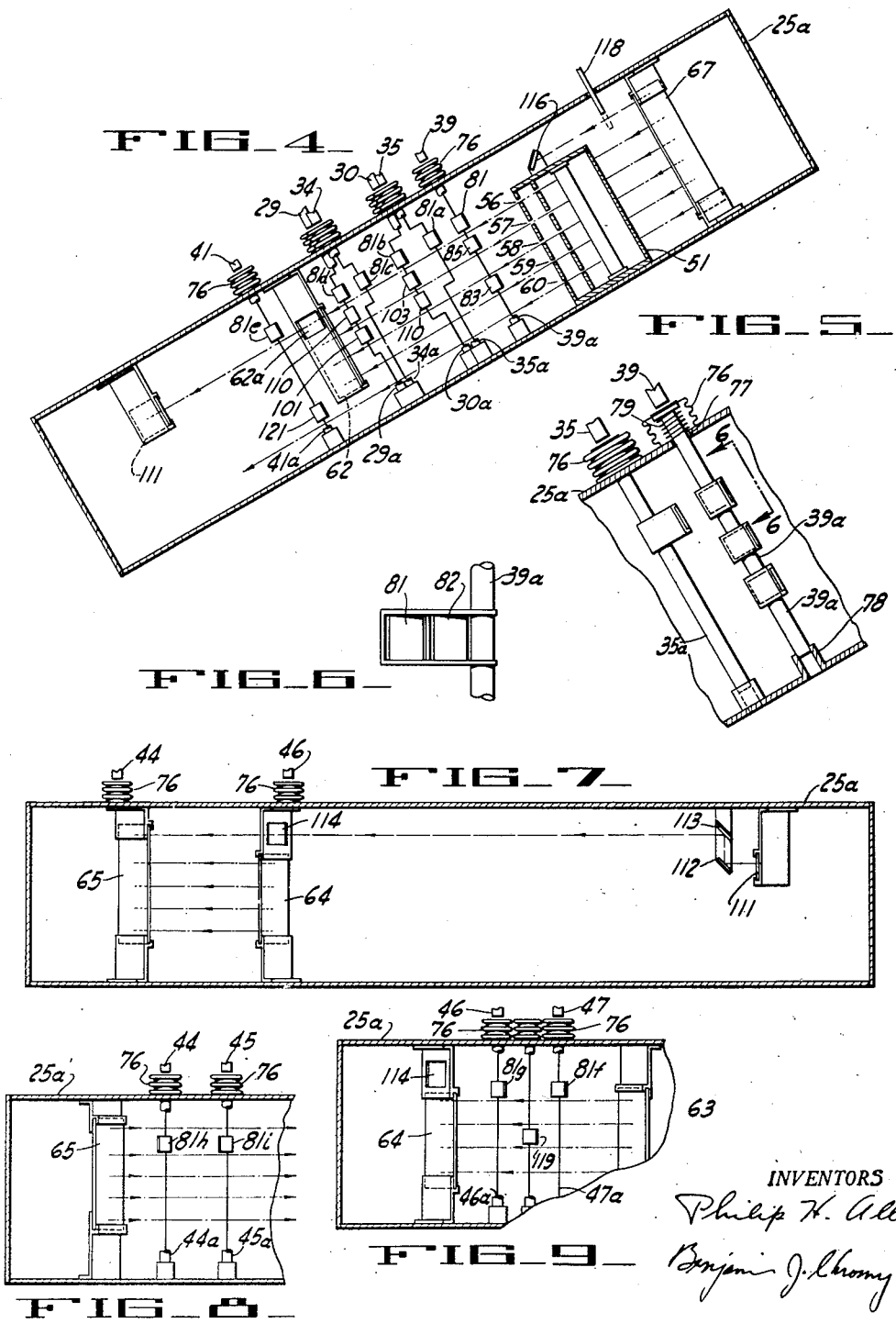

Sept. 8, 1953     P. H. ALLEN ET AL     2,651,463
OPTICAL OPERATION CONTROL DEVICE
Filed Jan. 11, 1946     4 Sheets-Sheet 4
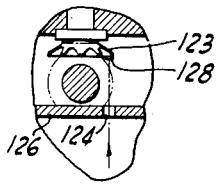
FIG_11_
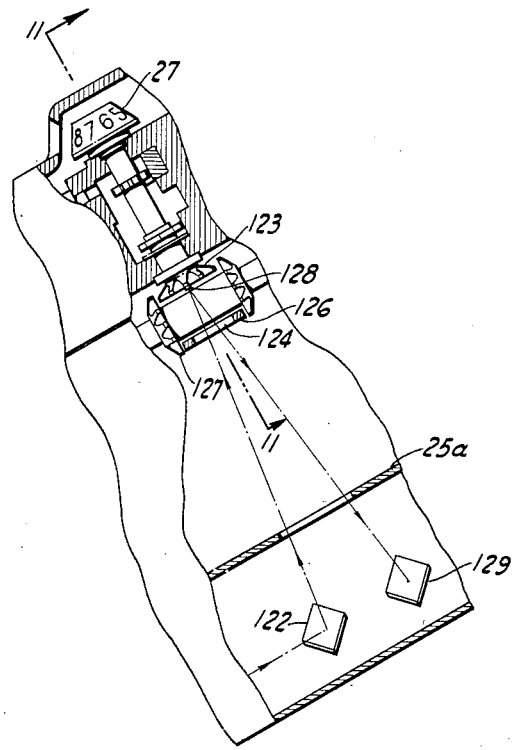
FIG_10_
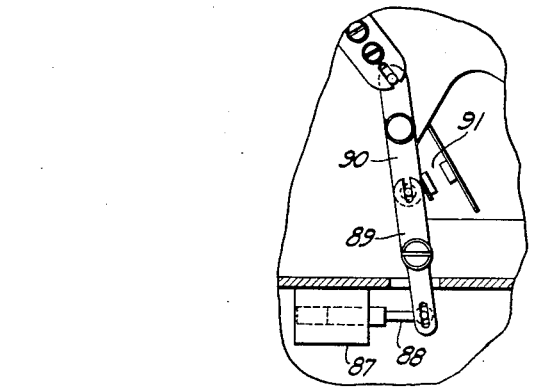
FIG_12_
FIG_13_
INVENTORS
Philip H. Allen
Benjamin J. Chromy Patented Sept. 8, 1953

2,651,463

UNITED STATES PATENT OFFICE 2,651,463

OPTICAL OPERATION CONTROL DEVICE

Philip H. Allen, Orinda, Calif., and Benjamin J. Chromy, Washington, D. C.

Application January 11, 1946, Serial No. 640,462

12 Claims. (Cl. 235—63)

This invention relates to registers and similar devices such as calculating machines and is concerned more particularly with the provision of improved control means therefor.

It is a general object of the invention to provide an improved registering apparatus.

Another object of the invention is to provide a registering machine having optical-electrical control means incorporated therein for exercising control over various machine operations.

A further object of the invention is to provide a machine of the above character in which a single optical-electrical control means is associated with a plurality of the manually operable controls of the machine.

Another object of the invention is to provide a machine of the above character incorporating a shiftable carriage which exercises a control over the optical-electrical control means of the machine.

Another object of the invention is to provide a calculating machine having improved means for performing division operations.

Another object of the invention is to provide improved overdraft control means in a machine of the class described.

Other objects of the invention will be apparent from the following description of the preferred embodiment of the invention as illustrated in the accompanying drawings, in which:

Figure 2 is a sectional plan view of the optical-electrical control system of the machine.

Figure 3 is a sectional view taken as indicated by the line 3—3 of Figure 2 illustrating the arrangement of the light responsive devices of the optical-electrical control means and also illustrating diagrammatically the electrical connections of these devices to solenoids which perform the control exercised thereby.

Figure 4 is a sectional elevational view of a portion of the optical-electrical control means taken as indicated by the line 4—4 in Figure 2.

Figure 5 is a fragmentary enlarged view of a portion of Figure 4 illustrating certain details of construction.

Figure 6 is an enlarged elevational view of a portion of Figure 5 taken as indicated by the line 6—6 of Figure 5.

Figure 7 is a front sectional elevation of a portion of the optical-electrical control means taken as indicated by the line 7—7 in Figure 2.

Figure 8 is an elevational view of a portion of the optical control system taken as indicated by the line 8—8 in Figure 2.

Fig. 9 is a fragmentary elevational view of a part of the optical control means taken as indicated by the line 9—9 in Figure 2.

Figure 10 is a sectional view illustrating the optical overdraft control employed in performing division operations.

Figure 11 is a fragmentary sectional view taken as indicated by the line 11—11 in Figure 10.

Figure 12 is a fragmentary sectional view illustrating one method of operating certain of the machine controls.

Figure 13 is a sectional view illustrating a method of operating the main clutch and circuit controls of the machine.

Figure 1:
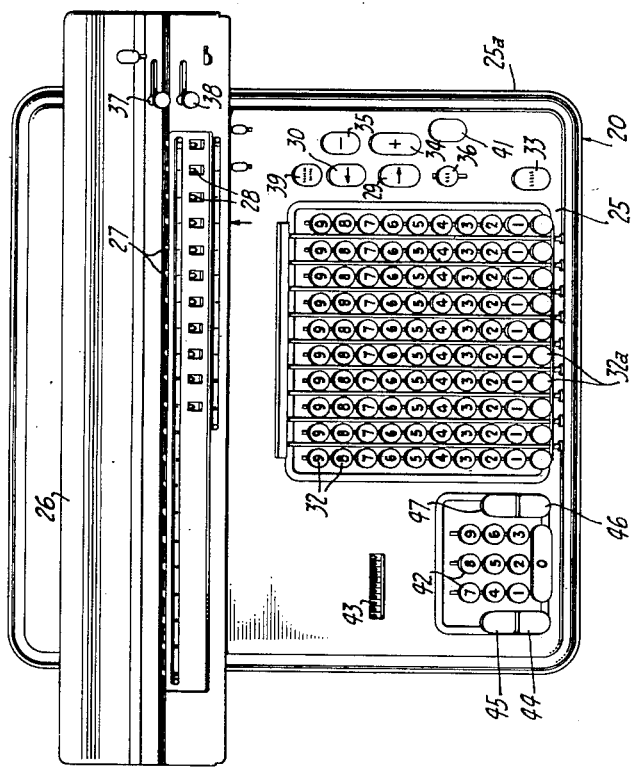
Figure 1 is a plan view of a calculating machine embodying the instant invention.

Generally the instant invention contemplates the use of light rays and light responsive devices for exercising the various control functions of the machine such as engagement of the main clutch, the shift clutches, the resetting clutches and exercising the overdraft control in performing division. The invention may be applied to conventional forms of calculating machines such as are now on the market under the trade names of Marchant, Monroe, and Friden, and is illustrated in connection with a calculator of the character disclosed in the patent to Carl M. Friden No. 2,229,889 dated January 28, 1941, and the co-pending applications of Carl M. Friden, Serial No. 205,546, filed May 2, 1938, now Patent No. 2,371,752, and Carl M. Friden and Anthony B. Machado Serial No. 348,966, filed July 31, 1940, now Patent No. 2,399,917.

Referring to Figure 1 the calculator includes a body 25 in which the actuating, selecting and control mechanisms are mounted, and carriage 26 which is mounted for endwise shifting movement transversely of the body 25 and which carries numeral wheels 27 and 28 of the accumulator and revolution counter respectively. Carriage 26 can be shifted by power in either direction by manipulation of respective shift keys 29 and 30 through mechanism of conventional character.

Values are entered into the calculator by depression of numeral keys 32 of the usual value entering or multiplicand keyboard in various ordinal rows thereof, keys 32 being releasable individually by the depression of ordinal clear keys 32a or collectively by depression of clear key 33. Values introduced into the calculator may be registered additively or subtractively on numeral wheels 27 by depression of plus key 34 or minus key 35, respectively. If desired add key 36 may be depressed to cause clearing of the keyboard in the usual manner after single registrations in the accumulator.

Values registered in numeral wheels 27 and 28 can be removed through resetting mechanism operated by manipulation of respective manually operable resetting handles 37 and 38 or by power through depression of return and clear key 39.

The calculator is adapted to perform automatic plural order division by means of conventional division mechanism including the starting control key 41 of the character disclosed in the patent to Carl M. Friden, 2,327,981 issued August 31, 1943. Automatic predetermined multiplication can also be performed by depression of the multiplier selection keys 42 to set up the desired multiplier figure as indicated on dials 43, and by depression of one of the multiplication keys 44, 45 or 46, to start the multiplying operation. Key 47 is a correction key for correcting the multiplier figure and zeroizing the indicating dials 43.

In exercising the optical-electrical control of the various machine functions there is provided a source of a plurality of light rays which provide a ray for each machine function to be controlled and whose path passes by the various control keys or elements controlled thereby so that the path of a light ray can be varied upon depression of control keys to cause impingement thereof on a light responsive device. The light responsive device is electrically connected to a solenoid which operates a mechanical control element of the calculator which must be moved to effect the desired machine function.

Referring to Figures 2 and 4 there is illustrated a lower body portion 25a in the form of an auxiliary light-proof casing which is disposed below the conventional parts of the calculator, but in alignment with the general plane of the calculator. Within the body portion 25a there is provided an auxiliary housing 51 having a chamber 52 containing a source of light 53 such as a neon or fluorescent tube and a second chamber 54 having a plurality of light responsive devices 55 which may be of any desired type such as a resistance type selenium cell, a conduction type photo tube, an electron emissive cathode tube, or a photovoltaic cell. The housing 51 is provided with a series of vertically aligned pairs of apertures 56 through 60 respectively so that five collimated light rays are produced which are normally projected along a path indicated by the dot and dash lines 61 in Figure 2, and optical means are associated with the light rays to provide respective paths thereof disposed beneath the various operation control keys of the machine for the desired machine functions. This optical system includes a series of reflecting elements or mirrors 62 through 67 respectively. In the present embodiment all of these mirrors are disposed at an angle of 45° with respect to an impinging light ray so that the light ray is reflected at an angle of 90° to its former path in each instance, the arrangement of the mirrors being such that the light rays following the mirror system 62 through 67 will impinge upon an opaque wall portion of the housing 51 as indicated in Figure 2 out of alignment with a series of apertures 68 through 72 respectively (Figure 3) which lead to associated light sensitive devices 55 as previously described.

In order to exercise a controlling function with respect to the light rays each of the control keys is extended to have its lower end disposed above a flexible bellows 76 (Figures 4 and 5) enclosing an aperture 77 in the body portion 25a and having the upper end of an auxiliary key stem 39a, for example, in abutting relation with the top surface of the bellows. The auxiliary key 39a is guided in the upper wall of the body portion 25a and in a suitable guide 78 in the bottom wall of this housing. A spring 79 serves to maintain the auxiliary key stem 39a in elevated position.

While this auxiliary key stem construction has been described in connection with the resetting key 39 it will be understood that similar auxiliary keys are provided in connection with the control keys 29, 30, 34, 35, 41, 44, 45, 46 and 47 of the calculating machine and these auxiliary key stems or auxiliary control keys have been designated by like numerals with the addition of the suffix a. The auxiliary key 39a is provided with a light ray controlling optical system including a pair of parallel reflecting elements or mirrors 81 and 82 which are disposed immediately above the uppermost light ray emerging from the apertures 56. These mirrors 81 and 82 are at an angle of 45° with respect to the light ray so that when moved into the path of the light ray the effect is to laterally displace the associated light ray so that it impinges upon the reflecting mirror system 62 through 67 at a different position and will pass through the corresponding aperture 68 to impinge upon the corresponding light sensitive device 55. This condition is indicated by the line of dashes in Figure 2.

From the above description it will be seen that whenever the control key 39 for example is depressed the mirrors 81—82 associated with the uppermost light ray employed for controlling the main clutch will cause a variation or displacement of the path of the light ray so that it will be placed in operative relation with respect to the uppermost light sensitive device 55. The auxiliary key 39a is provided with a second set of mirrors 83—84 which are disposed immediately above the light ray emerging from the apertures 59 and associated with the resetting control in a manner later described, this light ray entering the aperture 71 (Figure 3) when deflected by the mirrors 83—84. The key 39a is also provided with a third set of mirrors 85—85a associated with the light ray emerging from the apertures 57 associated with the shift mechanism as later described.

In the case of the main clutch control, that is the light ray provided by the uppermost apertures 56, each of the control keys is provided with mirrors corresponding to the pair of mirrors 81—82 for causing engagement of the main clutch upon depression of any one of these keys. For this purpose the uppermost light sensitive device 55 is connected through an amplifier 86 (Figure 3) to a solenoid 87 so that the solenoid 87 will be energized when any of the control keys are depressed. The solenoid 87 (Figure 13) has its armature 88 connected to a lever 89 to cause pivoting movement of the lever 89 when the solenoid is energized. The lever 89 is pivotally connected to a lever 90 forming a part of the conventional clutch control of the Friden type calculator as disclosed in the above Patent 2,229,889 and also forming a control for the circuit making contacts 91 of the electric drive motor. The clutch controlling mirrors of the remaining control keys are numbered similarly to the mirrors 81—82 but with the suffixes a, b, c, d, e, etc.

The mirrors 83 on the auxiliary resetting key 39a serve to deflect the fourth light ray emerging from the apertures 59 when in operative position and cause this ray to impinge through apertures 71 upon the fourth from the top light sensitive device 55 which is electrically connected through amplifier 92 to the solenoid 93. The solenoid 93 is operatively connected to shift the resetting clutch control rod of the Friden calculator as illustrated in Figure 12. The armature of the solenoid 93 is connected to a pivoted lever 96 having a forked upper end embracing the conventional resetting clutch shift rod 97 of the Friden calculator and engaging a collar 98 thereon. The deflecting mirrors 85 at the same time serve to deflect the light ray from the apertures 57 to cause it to pass through the apertures 69 and effect operation of the left shift mechanism so that the carriage will be returned to its left end position as a preliminary to the resetting operation.

Thus whenever the resetting control key 39 is operated both the main clutch, the resetting clutch and the left shift clutch are engaged to effect the resetting operation with respect to the accumulator and revolution counter as disclosed in the above named Friden Patent 2,399,917. By virtue of the fact that the resetting control light ray traverses a path extending at various points along the operative controls of the calculator it is apparent that at any other selected point along this path or along another desired path a second resetting control key could be installed to function in the same manner as the key 39 and the auxiliary key 39a.

The auxiliary right and left shift keys 29a and 30a have respective sets of mirrors 101 and 103 associated respectively with the light rays from the apertures 58 and 57, respectively, so that these light rays upon depression of either shift key will be offset in the manner previously described to cause the light rays to enter either of the apertures 70 and 69 and operate the light sensitive devices 55 in the second and third positions from the top. These light sensitive devices are connected to respective amplifiers 105 and 106 with respective solenoids 107 and 108 which are associated with the respective left and right shift control rods of the Friden calculator in the manner described in connection with the shift clutch control rod 97 illustrated in Figure 12. Thus upon depression of either shift key the associated shift clutch will be engaged as well as the main clutch to effect shifting of the carriage in the desired direction. It is obvious that additional shift keys could be employed at other portions of the paths of the light means associated with the shift control mechanism and that automatic shifting in the course of division or multiplying operations may be performed by providing appropriate light ray control mirrors such as those indicated at 118—119 in Figure 9.

Also, the respective auxiliary shift keys 29a and 30a are provided with respective shutters 110 to block off, respectively, the control light ray for the other shift key, and thereby provide an interlock without the use of mechanical interconnection.

In order to perform automatic division operations with an optical electrical control a special main clutch control is provided as well as a normally disabled overdraft control as will now be described.

In order to prevent effective operation of the division key when the register carriage 26 is in its lowest ordinal position where only one significant quotient figure could be registered the mirror 62 is provided with a half-silvered portion 62a (Figure 4) in alignment with the clutch control light ray from the apertures 56 so that a portion of this ray is reflected to follow the normal path along the mirrors 63 through 67 while the second portion is passed through the half-silvered mirror 62a and this second portion traverses a path leading past the control mirrors 81e—82e of the auxiliary division key 41a to a 45° mirror 111 (Figures 2 and 4). The ray reflected from the mirror 111 is offset upwardly by a pair of 45° parallel mirrors 112—113 (Figure 7) so that the light ray passes through an aperture 114 in a supporting bracket for the mirror 64 and impinges upon the uppermost portion of the mirrors 65, 66 and 67 in a plane located above the housing 51. An additional deflecting mirror 116 is provided (Figure 4) to direct the ray downwardly through an aperture 117 to impinge upon the uppermost main clutch control light sensitive device 55. Associated with this division clutch control light ray is a shutter 118 (Figure 4) which is depressed to its dotted line position by the register carriage 26 in any convenient manner when the carriage is in its leftmost position so that depression of the division key 41 is inoperative with the carriage in this position to initiate a division operation as the main clutch can not be engaged.

To provide an optical-electrical overdraft control the lowermost light ray from the aperture 60 (Figure 4) passes immediately beneath a single reflecting mirror 121 carried by the auxiliary division key 41a and when the division key is not depressed the light ray is inactive. When the division key is depressed the mirror 121 serves to reflect the light ray to an obliquely disposed mirror 122 (Figures 2 and 10, which is so disposed as to project the light ray toward the aligned numeral wheel 27 of the accumulator and specifically toward the drive gear 123 of the numeral wheel through an aperture 124 in the control gate 126 for the plus-minus gears 127 which serve to drive the numeral wheel through the gear 123 in a conventional manner. Numeral wheel 27 is provided with a mirror disposed on the lower face of gear 123 and this mirror is so related to the numeral wheel as to reflect the light means from the mirror 122 when the numeral wheel 27 in the desired ordinal controlling position for an overdraft in division operation passes from 0 to 9. When the mirror 128 is in operative position the light ray is reflected downwardly again through the aperture 124 to a second obliquely disposed mirror 129 which is so related to the mirror 128 and the mirror 67 as to direct the light means into the lowermost aperture 72 (Figure 3) so that the light sensitive device 55 associated with the division control will be energized and through the amplifier 131 operate solenoid 132. The solenoid 132 is operatively connected by means similar to the mechanism shown in Figure 12 to the program control shaft of the division control mechanism which corresponds to the shaft 222 shown in the Patent 2,327,981 so that the program control shaft will be shifted axially to initiate correction of the overdraft, shifting of the carriage, and resetting of the machine for subtraction in the next adjacent order.

The amplifiers 86, 92, 105, 106 and 131 may be of any conventional type employing triode or multi-grid tubes and these amplifiers may be energized from the 110 volt A. C. or D. C. lighting circuit. Gas type tubes, such as thyratrons, also may be used and in such case these tubes may be made light sensitive so that they may also function as the light responsive devices 55. When gas type tubes, such as thyratrons, are used the plate circuits thereof and the solenoids 87, 93, 107, 108 and 132 respectively are preferably energized from an alternating current supply so that the plate circuits of these gas tubes are self-quenching.

While certain preferred embodiments have been shown and described it is apparent that the invention is capable of further variation and modification within the scope of the claims appended hereto.

We claim:

1. In a calculating machine having an accumulator and means for entering values therein, means for performing a calculating operation, a plurality of control elements for said operation performing means, means for establishing a single light ray, means controlled by said ray for initiating operation of said operation performing means, an optical system for directing said ray past each of said elements and to said operation initiating means, and means under control of each of said elements for rendering said ray effective with respect to operation initiating means.

2. In a calculating machine having an accumulator and means for entering values therein, means for performing a calculating operation including a plurality of operation control mechanisms, a control element for each of said mechanisms, means for establishing a plurality of light rays and directing them into operative relation with said elements, a corresponding plurality of light responsive means positioned for selective impingement by said rays, means controlled by each of said light-responsive means for operating one of said mechanisms, and means operable under control of said elements for selectively rendering said rays effective with respect to the associated light responsive means.

3. In a calculating machine having an accumulator including numeral mechanism and means for entering values therein, means for performing a division operation including a starting control element, and an optical system in controlling relation with said operation performing means, said optical system comprising a light responsive device, a light source for establishing a light ray, and a plurality of optical devices for selectively transmitting said ray from said source to said light-responsive device, said optical devices including an optical device controlled by said control element and a second optical device controlled by said numeral mechanism for terminating an ordinal computation, said second optical device being rendered effective by said numeral mechanism upon an overdraft thereof.

4. In a calculating machine having an accumulator and means for entering values therein, means for performing a computing operation including a plurality of operative control mechanisms, a bank of control keys for said mechanisms, means for establishing a plurality of light rays and directing them along said bank of keys, a corresponding plurality of light responsive means positioned for selective impingement by said rays, means controlled by each of said light responsive means for operating one of said mechanisms, and selectively positioned light control elements carried by said respective keys for controlling the effective condition of said light rays with respect to the respective associated light responsive means, certain of said keys carrying a plurality of said control elements.

5. In a calculating machine having an accumulator and means for entering values therein, means for performing a computing operation including a plurality of operative control mechanisms, a pair of parallel banks of control keys for said operation control mechanism, means for establishing a plurality of light rays and directing them past and between said respective banks of control keys, a corresponding plurality of light responsive means positioned for selective impingement by said rays, means controlled by each of said light responsive means for operating one of said mechanisms, and selectively positioned light control elements carried by said respective keys of each bank for controlling the effective condition of said light rays with respect to the respective associated light responsive means certain of said keys carrying a plurality of said control elements.

6. In a calculating machine having a shiftable accumulator including numeral wheels and means for entering values therein, means for performing a division operation including an optical overdraft control system, said optical system including a light responsive control device, a plurality of optical elements for selectively transmitting a light ray to said control device, certain of said optical elements being carried by at least some of said numeral wheels and adjustable thereby to control transmission of said light ray, and means for establishing a light ray to cooperate with said optical elements in an ordinal control position of said shiftable accumulator.

7. In a calculating machine having a shiftable accumulator including numeral wheels and means for entering values therein, means for performing a division operation including an optical overdraft control system, said optical control system including a plurality of optical elements carried by at least certain of said numeral wheels, and means for establishing a light ray to cooperate with said optical elements in an ordinal control position of said shiftable accumulator, each said optical element being positioned on the associated numeral wheel for functioning with respect to the light ray upon an overdraft of said accumulator.

8. In a calculating machine having a body including value entering means, an accumulator including numeral wheels mounted for shifting movement on said body, means for performing a machine operation involving shifting of said accumulator, and an optical system in controlling relation with said operation performing means including an optical device carried by one of the numeral wheels of said accumulator, and a light ray source in said body for cooperation with the optical device of said numeral wheel in a selected ordinal position of said shiftable accumulator.

9. In a calculating machine having an accumulator and means for entering values therein, means for initiating operation of the machine including a clutch, a plurality of control elements for said operation initiating means including a division control element, means for establishing a light ray and for dividing and directing respective portions of said ray past respective ones of said elements, one of said portions being directed past said division control element, means controlled by said ray for rendering said operation initiating means effective, means under control of said respective elements for rendering the respective portions of said ray effective with respect to said operations initiating means, and means for selectively blocking said one portion of said ray to disable the control of said division control element.

10. In a calculating machine having an accumulator including numeral mechanism and means for entering values therein, means for performing an ordinal calculating operation including a starting control element, and an optical system in controlling relation with said operating performing means, said optical system comprising a light responsive device, a light source for establishing a light ray, and a plurality of optical devices for selectively transmitting said ray from said source to said device, said optical devices including an optical device controlled by said control element to render said optical system effective and a second optical device controlled by said numeral mechanism to control termination of the ordinal computation.

11. In a calculating machine having an accumulator including numeral mechanism and means for entering values therein, means for controlling entry of a number in the numeral mechanism, means including an optical system for controlling said operation performing means, said optical system including a light responsive control device, a light source for establishing a light ray, and a plurality of optical elements for selectively transmitting said ray from said source to said control device, one of said optical elements being carried by said numeral mechanism and adjustable thereby to control transmission of said light ray pattern, and control means for rendering said optical system effective to control the machine operation.

12. In a calculating machine having an accumulator including a series of numeral wheels, and means for entering values in said numeral wheels, and means including an optical system for controlling said value entering means, said optical system including a light responsive control device, a light source for establishing a light ray, and a plurality of optical elements for selectively transmitting said ray from said source to said control device, one of said optical elements being carried by one of said numeral wheels and adjustable therewith to control transmission of said light ray.

PHILIP H. ALLEN.
BENJAMIN J. CHROMY.

References Cited in the file of this patent

UNITED STATES PATENTS

| Number | Name | Date |
|---|---|---|
| 1,801,484 | Bricken | Apr. 21, 1931 |
| 1,807,011 | Ranger | May 26, 1931 |
| 2,032,168 | Degen | Feb. 25, 1936 |
| 2,039,832 | Palmer | May 5, 1936 |
| 2,063,482 | Bryce | Dec. 8, 1936 |
| 2,131,911 | Ayres | Oct. 4, 1938 |
| 2,168,886 | Roberts | Aug. 8, 1939 |
| 2,237,898 | Bitner | Apr. 8, 1941 |
| 2,254,982 | Bryce | Sept. 2, 1941 |
| 2,255,147 | Broido | Sept. 9, 1941 |
| 2,294,679 | Maul | Sept. 1, 1942 |
| 2,297,743 | Carroll et al. | Oct. 6, 1942 |
| 2,302,025 | Gould | Nov. 17, 1942 |
| 2,310,482 | Watson | Feb. 9, 1943 |
| 2,337,082 | Broido | Dec. 21, 1943 |
| 2,358,051 | Broido | Sept. 12, 1944 |
| 2,363,737 | Machado | Nov. 28, 1944 |
| 2,399,917 | Friden et al. | May 7, 1946 |
| 2,408,754 | Bush | Oct. 8, 1946 |
| 2,432,527 | Lang | Dec. 16, 1947 |

FOREIGN PATENTS

| Number | Country | Date |
|---|---|---|
| 446,338 | Great Britain | Apr. 27, 1936 |
| 493,277 | Great Britain | Oct. 4, 1938 |
| 521,871 | Great Britain | June 3, 1940 |